(12) United States Patent
Huang et al.

(10) Patent No.: US 8,316,720 B2
(45) Date of Patent: Nov. 27, 2012

(54) TORQUE TESTING DEVICE

(75) Inventors: Teng-Tsung Huang, Tu-Cheng (TW); Guo-Jun Yu, Shenzhen (CN); Gong-Shui Cheng, Shenzhen (CN); Yong-Bing Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 295 days.

(21) Appl. No.: 12/908,982

(22) Filed: Oct. 21, 2010

(65) Prior Publication Data

US 2012/0024078 A1 Feb. 2, 2012

(30) Foreign Application Priority Data

Jul. 27, 2010 (CN) .......................... 2010 1 0237962

(51) Int. Cl.
*G01N 3/22* (2006.01)
*G01L 3/02* (2006.01)
(52) U.S. Cl. ........................ 73/847; 73/848; 73/862.191

(58) Field of Classification Search ............. 73/862.191, 73/847, 848
See application file for complete search history.

(56) References Cited

U.S. PATENT DOCUMENTS

| 2,300,288 | A | * | 10/1942 | Hullhorst | ............... 73/862.191 |
| 5,567,884 | A | * | 10/1996 | Dickinson et al. | ............... 73/814 |
| 6,381,809 | B2 | * | 5/2002 | Uneme et al. | ................... 16/342 |
| 2011/0277561 | A1 | * | 11/2011 | Huang et al. | ............. 73/862.191 |

* cited by examiner

*Primary Examiner* — Lisa Caputo
*Assistant Examiner* — Jonathan Dunlap
(74) *Attorney, Agent, or Firm* — Altis Law Group, Inc.

(57) ABSTRACT

A torque testing device is for testing the torque of a hinge. The torque testing device includes a main board, two sidewalls respectively located at two sides of the main board, and a loading board rotatably mounted between the sidewalls. The loading board is for retaining the hinge. Additionally, a sensor is mounted on the loading board. a measuring element is mounted on the sensor, and a testing ring is mounted on the main board. The hinge is rotated to drive the loading board to rotate relative to the sidewalls so the measuring element move toward and presses the testing ring, thereby the testing ring applies torque to the measuring element and the sensor senses the torque applied to the measuring element, which is equal to the torque of the hinge being tested.

8 Claims, 7 Drawing Sheets

TORQUE TESTING DEVICE

BACKGROUND

1. Technical Field

This disclosure relates to torque testing devices, particularly to torque testing devices for testing hinges.

2. Description of Related Art

The torque value is an important parameter of a hinge of an electronic device, such as mobile phone or palm computer. Thus, the torque of the hinge must be tested in the manufacture procedure. However, the typical way to test the torque of the hinge is manually, which makes it difficult to get a precise value of the torque of the hinge.

Therefore, there is a room for improved in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary torque testing device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
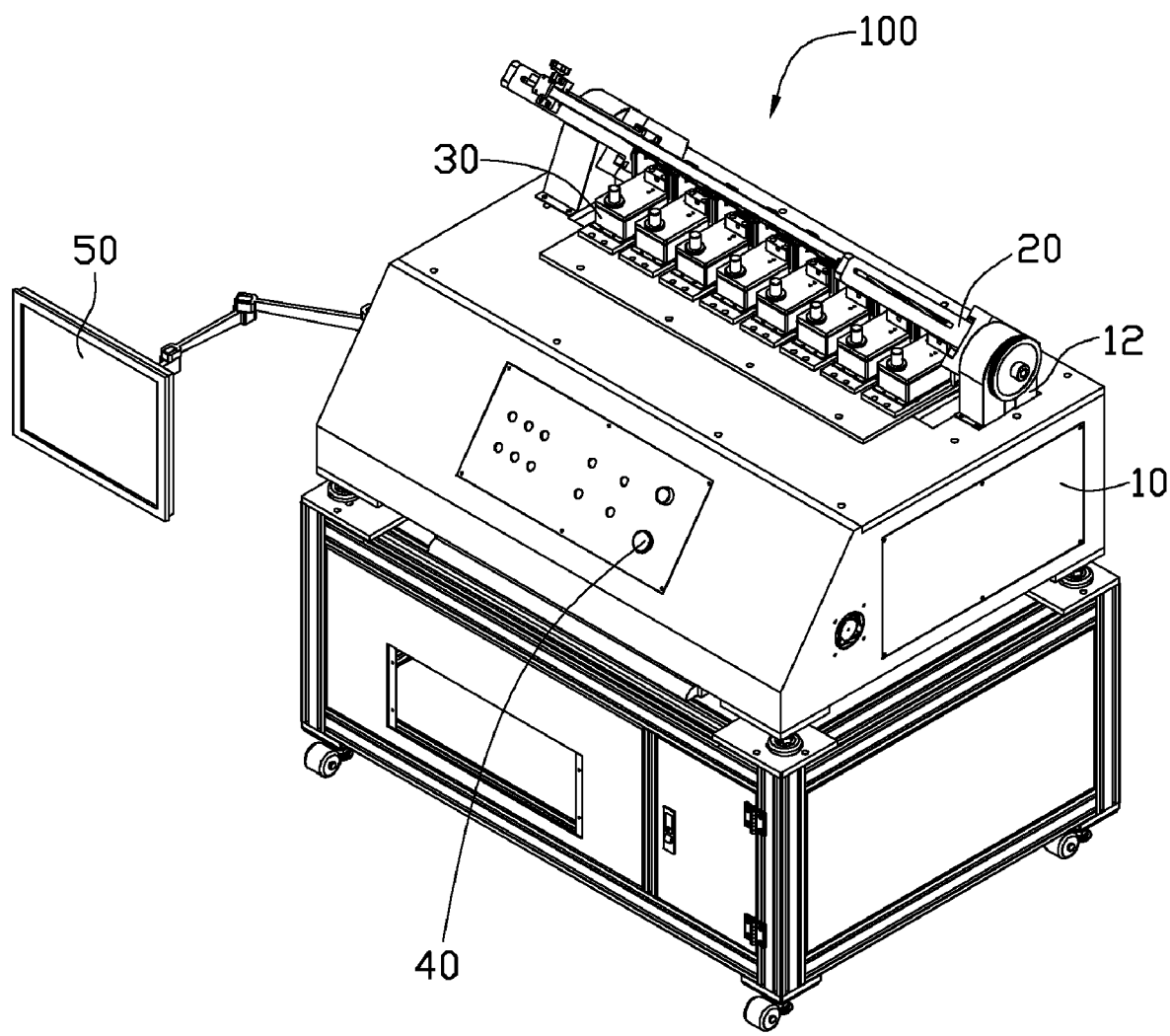
FIG. 1 is a schematic view of an exemplary embodiment of a torque testing device.
Figure 2:
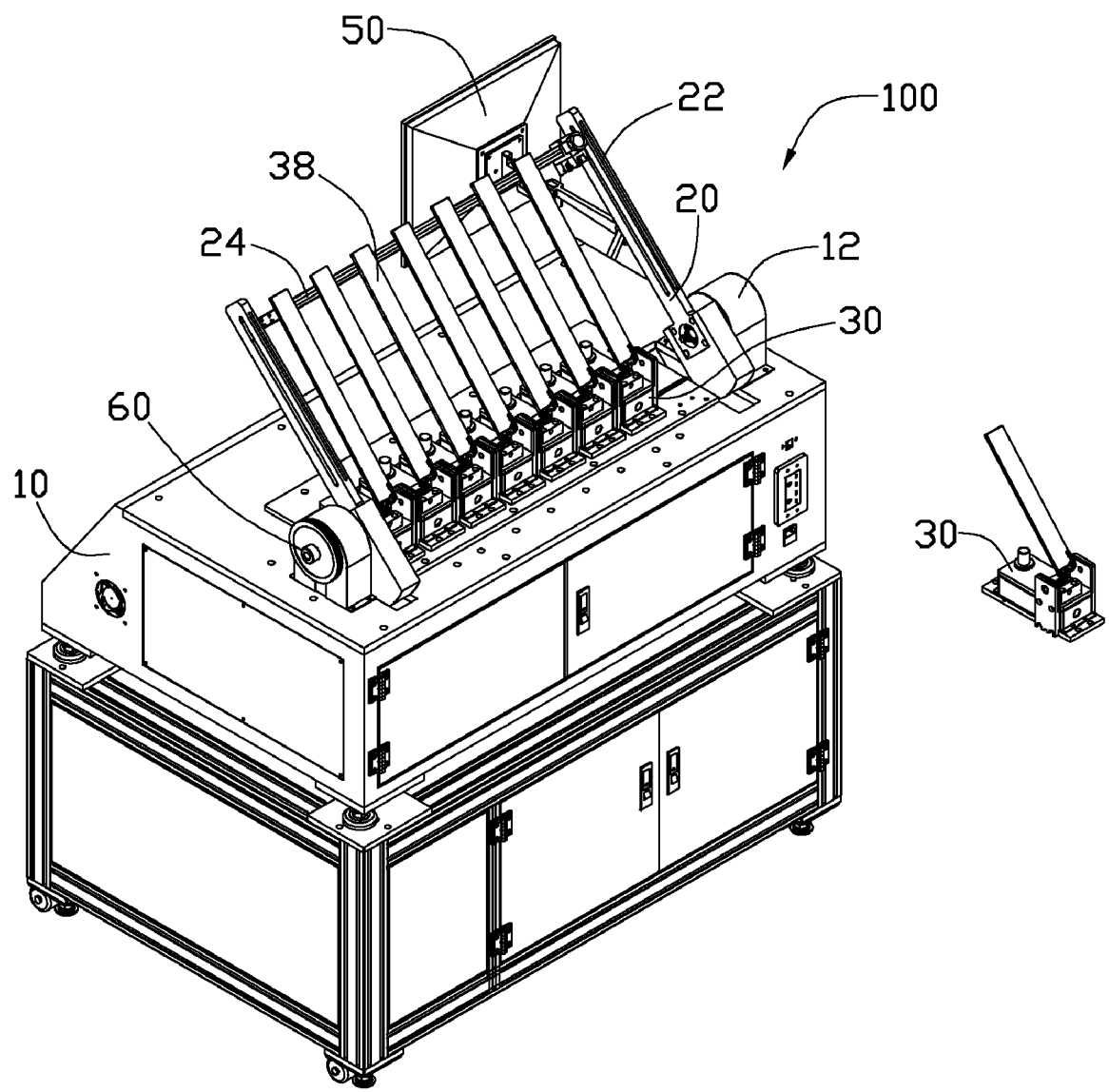
FIG. 2 is similar to the FIG. 1, but a testing element is removed from the torque testing device.
Figure 3:
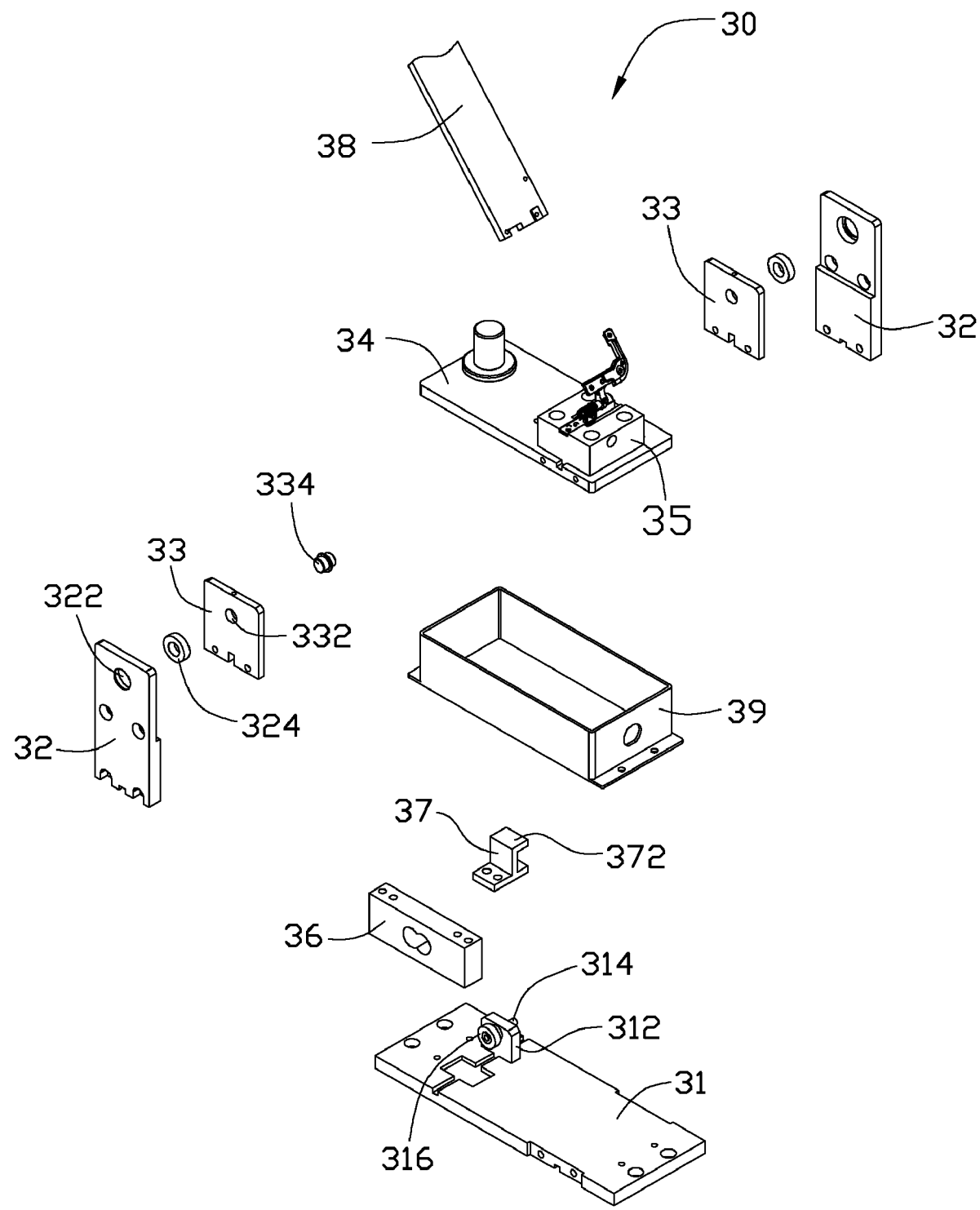
FIG. 3 is an exploded view of a testing element.
Figure 4:
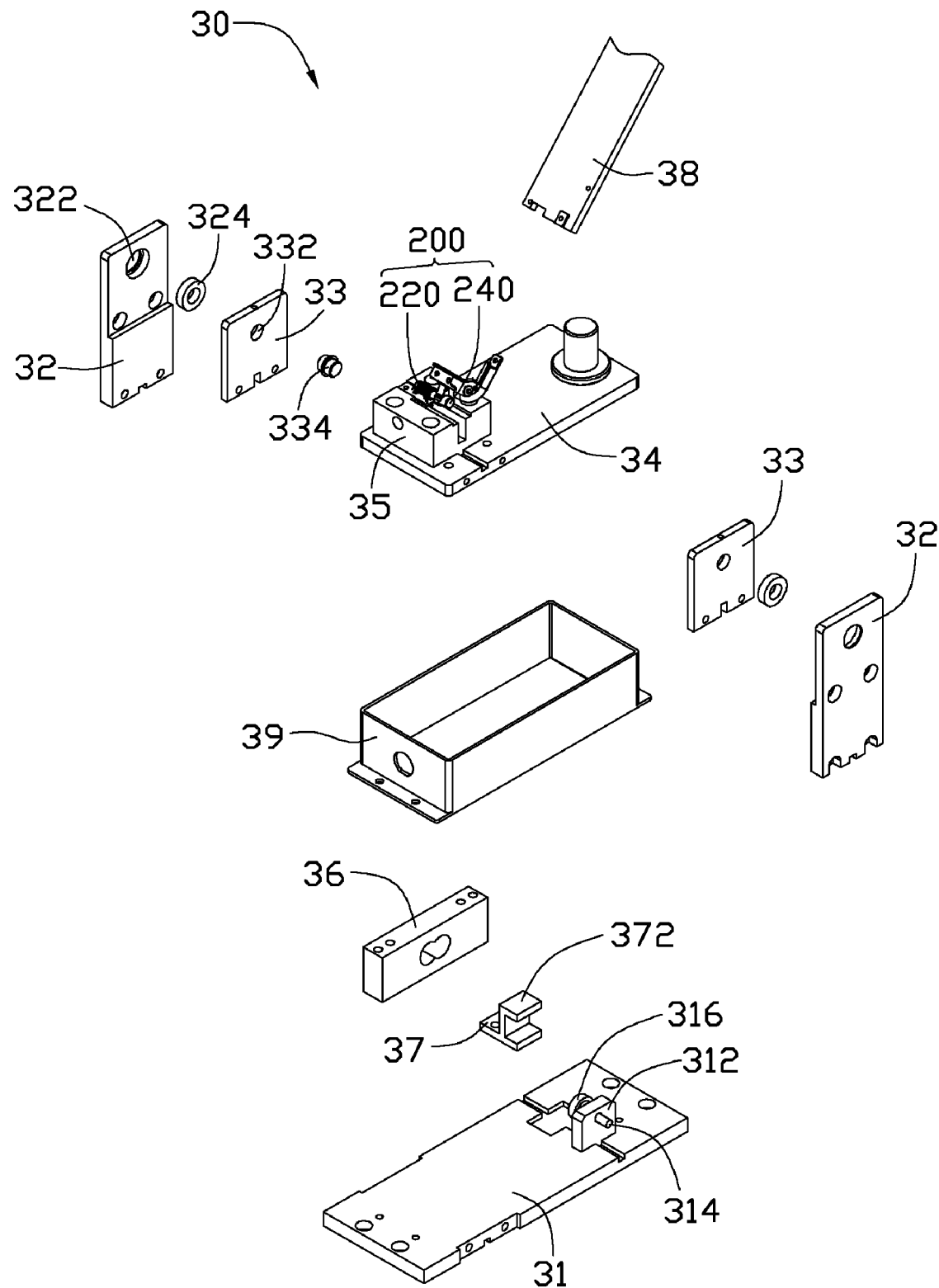
FIG. 4 is another exploded view of the testing element shown in FIG. 3.
Figure 5:
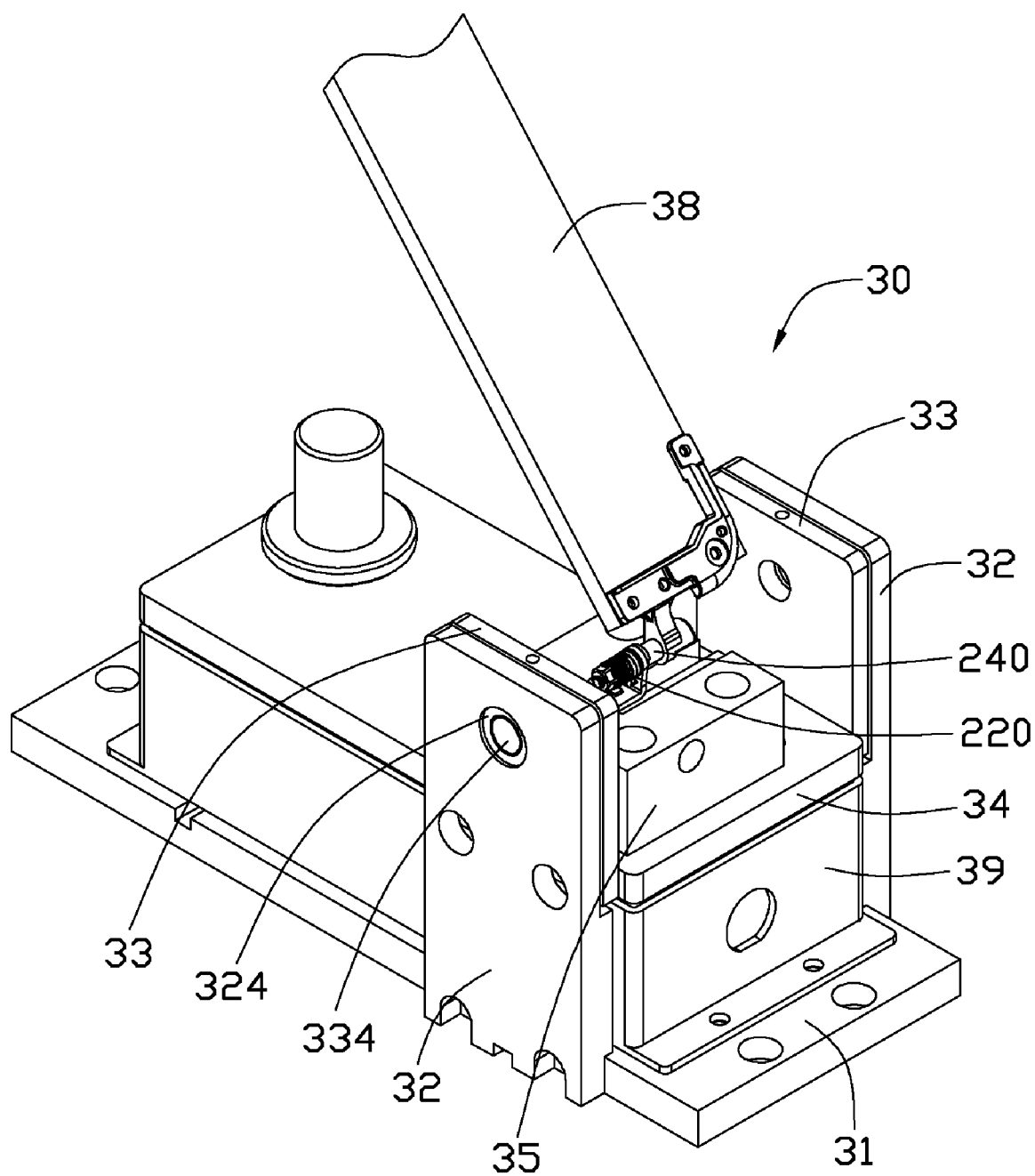
FIG. 5 is an assembled view of the testing element shown in FIG. 3.

Referring to FIGS. 1-3, an exemplary embodiment of a torque testing device 100 for measuring torque of a hinge 200 (referring to FIG. 4) is shown. The torque testing device 100 includes a chassis 10, a bracket 20 rotatably mounted to the chassis 10, one or more testing members 30, a controlling member 40, and a display 50. The chassis 10 includes two seats 12 opposite to each other. The bracket 20 includes two opposite rods 22 and a connecting board 24 for connecting the rods 22. Each rod 22 is rotatably mounted to one of the seats 12 by a post 60. Referring to FIGS. 4 and 5, the hinge 200 includes a retaining element 220 and a rotating element 240 rotatably mounted to the retaining element 220. The retaining element 220 is retained on the torque testing device 100 and the rotating element 240 can be rotated relative to the retaining element 220 by the torque testing device 100 so the torque of the hinge 200 can be tested by the torque testing device 100.

Referring to FIGS. 3 to 5, each testing member 30 includes a main board 31, two sidewalls 32, two supporting boards 33, a loading board 34, a retaining portion 35, a sensor 36 electrically connecting to the display 50, a measuring element 37, a transmitting plate 38 for transmitting force from the bracket 20 to the hinge 200, and a protecting box 39. Each sidewall 32 is located at one side of the main board 31. Each supporting board 33 is rotatably mounted to one of the sidewalls 32. The loading board 34 is mounted between the supporting boards 33. The retaining portion 35 is mounted on one surface of the loading board 34 and adjacent to one end of the loading board 34, for retaining the hinge 200 on the testing member 30. The sensor 36 is mounted to the other surface of the loading board 34 opposite to the retaining portion 35 and adjacent to another end of the loading board 34. The measuring element 37 is mounted to the sensor 36.

The main board 31 has a block 312 protruding therefrom, a shaft 314 mounted on the block 312, and a testing ring 316 wrapping around the shaft 314. Each sidewall 32 defines a bearing hole 322 and a bearing 324 retained in the bearing hole 322. Each supporting board 33 defines a retaining hole 332 and a revolving pole 334 retained in the retaining hole 332. Each revolving pole 334 is rotatably mounted in one of the bearings 324 so the supporting boards 33 can rotate around the revolving poles 334 relative to the sidewalls 32.

The measuring element 37 further includes two opposite protrusions 372, and the testing ring 316 is located between and spaced from the protrusions 372. One end of each transmitting plate 38 is mounted to the connecting board 24, and the other end of each transmitting plate 38 resists the rotating element 240 of the hinge 200. When the bracket 20 rotates, the transmitting plate 38 drives the rotating element 240 to rotate relative to the retaining element 220.

Referring to FIGS. 4-5, the assembly of the torque testing device 100 will be described relative to one of the testing members 30 and a corresponding transmitting plate 38. However, such action equally applies to other testing members 30 and corresponding transmitting plates 38. First, the shaft 314 is mounted on the block 312 and the testing ring 316 is mounted to the shaft 314. The retaining portion 35 and the sensor 36 are both mounted to the loading board 34. The measuring element 37 is mounted to the sensor 36. The revolving poles 334 are mounted in the retaining holes 332. The supporting boards 33 are respectively mounted at two sides of the loading board 34 near the retaining portion 35. The bearings 324 are mounted in the bearing holes 322. The sidewalls 32 are respectively mounted to two sides of the main board 31. The protecting box 39 is mounted on the main board 31. Each revolving pole 334 is rotatably mounted in one of the bearings 324 so the supporting boards 33 are rotatably mounted to the sidewalls 32, i.e., the loading board 34 is rotatably mounted to the main board 31. At this time, the testing ring 316 is located between the protrusions 372.

Figure 6:
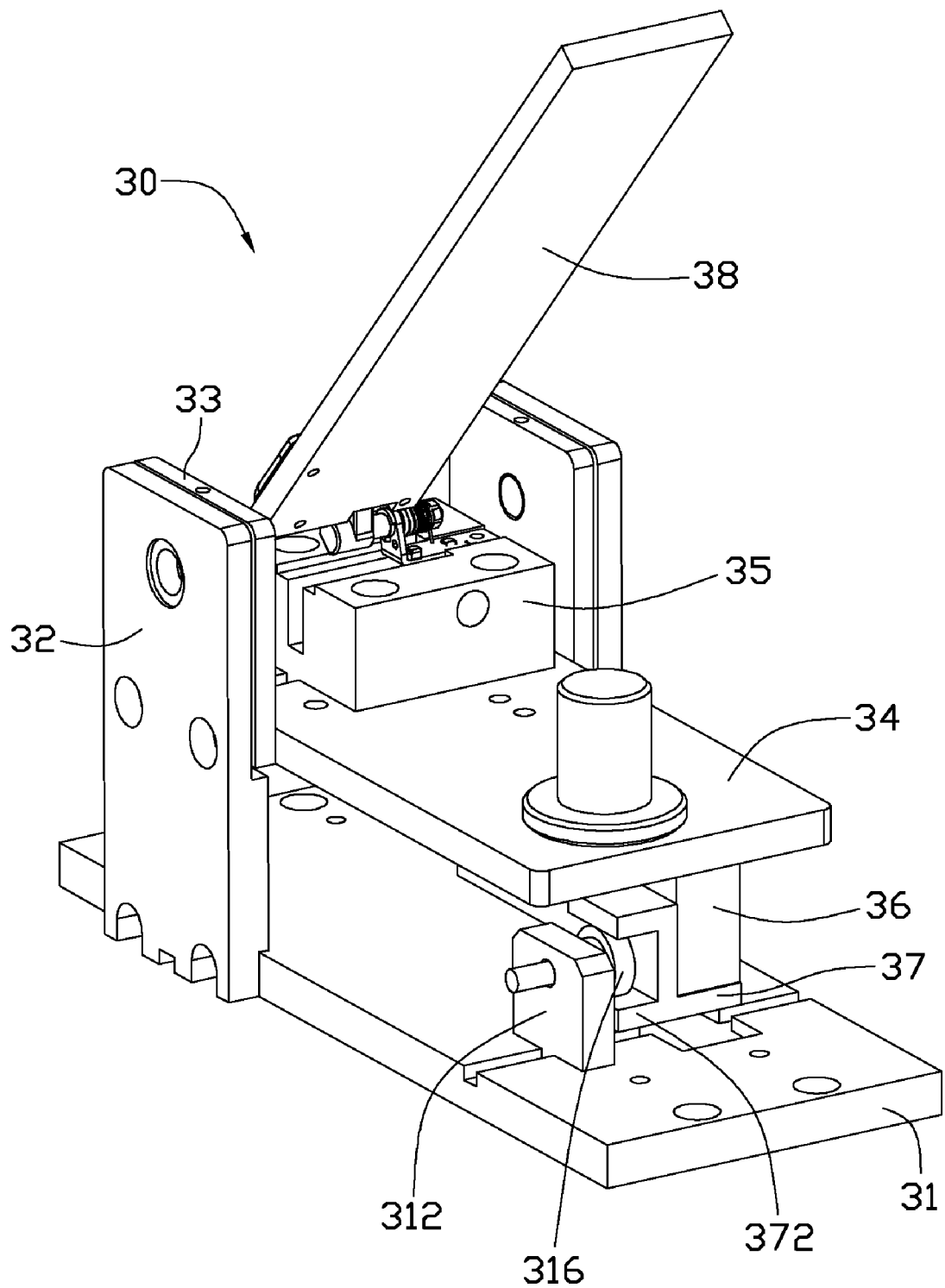
FIG. 6 is an assembled view of the testing element shown in FIG. 4.
Figure 7:
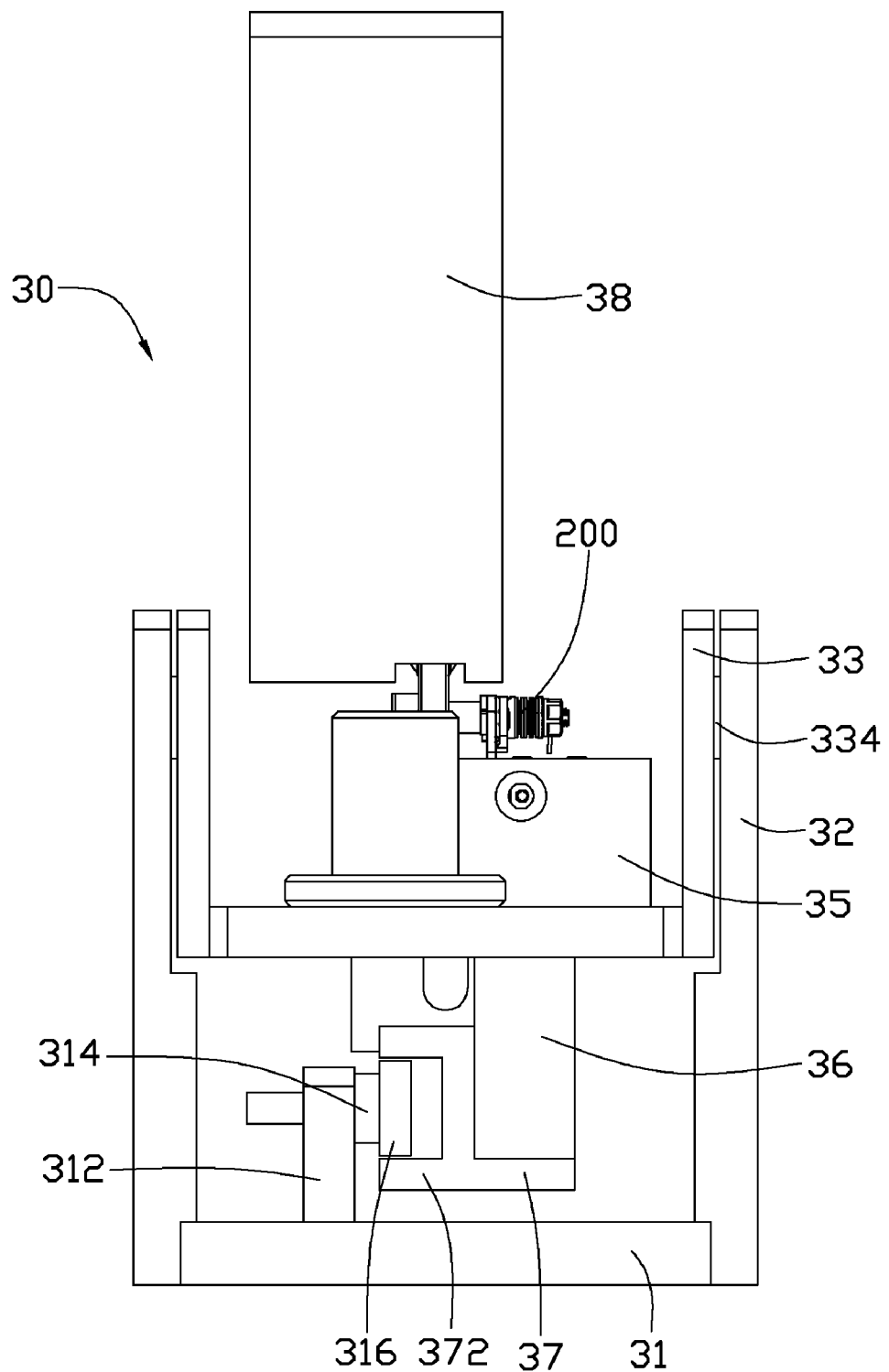
FIG. 7 is a planar view of the testing element shown in FIG. 6.

Referring to FIGS. 6 and 7, in use, the retaining element 220 of the hinge 200 is held in the retaining portion 35 and the rotating element 240 of the hinge 200 is retained to the transmitting plate 38. The torque testing device 100 is started by the controlling member 40 to drive the bracket 20 to rotate relative to the seats 12 around the posts 60.

As the bracket 20 rotates relative to the seats 12, the transmitting plate 38 drives the rotating element 240 to rotate relative to the retaining element 220. The retaining element 220 simultaneously drives the loading board 34 and the supporting boards 33 to rotate around the revolving pole 334 relative to the sidewalls 32 so that the measuring element 37 moves toward and presses the testing ring 316, thereby the testing ring 316 applies torque to the measuring element 37 and the sensor 36 senses the torque applied to the measuring element 37, and then the sensor 36 transmits a signal to the display 50, corresponding to the torque applied to the measuring element 37, which is equal to the torque of the rotating element 240.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A torque testing device for testing the torque of a hinge, the torque testing device comprising:
    a main board;
    two sidewalls respectively located two sides of the main board;
    a loading board rotatably mounted between the sidewalls, the loading board for retaining the hinge to be tested thereon;
    a sensor mounted on the loading board;
    a measuring element mounted on the sensor;
    a testing ring mounted on the main board;
    wherein the hinge to be tested is rotated to drive the loading board rotating relative to the sidewalls so the measuring element moves toward and presses the testing ring, thereby the testing ring applies a torque to the measuring element and the sensor senses the torque applied to the measuring element.

2. The torque testing device of claim 1, further including two supporting board respectively mounted on two sides of the loading board, each supporting board being rotatably mounted one of the sidewalls.

3. The torque testing device of claim 2, wherein each supporting board has a revolving pole mounted thereon; each sidewall having a bear mounted thereon; each bear rotatably engaging a revolving poles.

4. The torque testing device of claim 1, wherein the torque testing device further includes a retaining portion for retaining the hinge.

5. The torque testing device of claim 1, wherein the measuring element includes two opposite protrusions, the testing ring is located between the protrusions.

6. The torque testing device of claim 1, wherein the torque testing device further includes two opposite seats and a bracket rotatably mounted between the seats; the hinge is mounted between the bracket and the loading plate.

7. The torque testing device of claim 6, wherein the bracket includes two rods and a connecting board for connecting the rods, and a transmitting plate mounted on the connecting board; each rod is rotatably mounted one of the seats, the hinge is mounted between the transmitting plate and the loading plate.

8. The torque testing device of claim 1, wherein the torque testing device further includes a display electrically connected to the sensor.

* * * * *